United States Patent
Lavallee

(10) Patent No.: US 6,421,821 B1
(45) Date of Patent: Jul. 16, 2002

(54) FLOW CHART-BASED PROGRAMMING METHOD AND SYSTEM FOR OBJECT-ORIENTED LANGUAGES

(76) Inventor: Ronald J. Lavallee, 17201 Lakeview Cir., Northville, MD (US) 48167

( * ) Notice: Subject to any disclaimer, the term of this patent is extended or adjusted under 35 U.S.C. 154(b) by 0 days.

(21) Appl. No.: 09/265,912

(22) Filed: Mar. 10, 1999

(51) Int. Cl.[7] .............................................. G06F 9/45

(52) U.S. Cl. ..................................................... 717/109

(58) Field of Search ....................... 717/1, 109; 345/349

(56) References Cited

U.S. PATENT DOCUMENTS

| | | | | |
|---|---|---|---|---|
| 4,852,047 A | * | 7/1989 | Lavallee et al. ................. | 717/4 |
| 5,210,837 A | * | 5/1993 | Wiecek .......................... | 717/5 |
| 5,386,568 A | * | 1/1995 | Wold et al. .................... | 717/10 |
| 5,485,600 A | * | 1/1996 | Joseph et al. ................ | 345/473 |
| 5,625,823 A | * | 4/1997 | Debenedictis et al. ...... | 717/139 |
| 5,659,751 A | * | 8/1997 | Heninger ..................... | 709/305 |
| 5,774,122 A | * | 6/1998 | Kojima et al. .............. | 345/355 |
| 5,860,004 A | * | 1/1999 | Fowlow et al. ............. | 717/109 |
| 5,889,994 A | * | 3/1999 | Brown et al. .................. | 717/4 |
| 5,966,532 A | * | 10/1999 | McDonald et al. ............ | 717/1 |
| 6,038,393 A | * | 3/2000 | Iyengar et al. ................. | 717/1 |
| 6,167,563 A | * | 12/2000 | Fontana et al. ................ | 717/1 |
| 6,173,438 B1 | * | 1/2001 | Kodosky et al. ............... | 717/1 |
| 6,189,138 B1 | * | 2/2001 | Fowlow et al. ............... | 717/1 |
| 6,199,195 B1 | * | 3/2001 | Goodwin et al. .............. | 717/1 |
| 6,216,149 B1 | * | 4/2001 | Conner et al. .............. | 709/100 |
| 6,226,787 B1 | * | 5/2001 | Serra et al. ..................... | 717/4 |
| 6,230,309 B1 | * | 5/2001 | Turner et al. ................... | 717/1 |
| 6,233,733 B1 | * | 5/2001 | Ghosh ............................ | 717/7 |
| 6,243,092 B1 | * | 6/2001 | Okita et al. ................. | 345/349 |
| 6,272,672 B1 | * | 8/2001 | Conway ........................ | 717/1 |
| 2001/0018648 A1 | * | 8/2001 | Turner et al. ................ | 703/22 |

OTHER PUBLICATIONS

Gil et al., Three Dimensional Software Modeling, 1998, IEEE, pp. 105–114.*
Roman et al., Program Visualization . . . , 1992, ACM, pp. 412–420.*

* cited by examiner

Primary Examiner—Gregory Morse
Assistant Examiner—John Q. Chavis
(74) Attorney, Agent, or Firm—Robert K. Tendler

(57) ABSTRACT

A visual programming aid for object-oriented programming provides high level visualization for domain experts of the entire object-oriented program to permit understanding of the program on a macro level and to permit the domain expert to participate in the programming. In one embodiment, this is accomplished by visually arranging objects in flow charts, each object having a block number. The entire flow chart system represents the flow of events, not the flow of time. This permits concurrent execution of objects if the events permit. The objects are characterized as either action blocks or decision blocks, or both. In one embodiment action blocks are denoted as three dimensional rectangles, and decision blocks as three dimensional diamonds. Whether an object is an action or decision type is determined by object characterization which is the process of type casting the function of an object at its point of use on the flow chart. Note that decision objects are used to define the flow of groups of objects which do not have flow by themselves. In one embodiment, all objects execute independent of one another until such time as a decision object requires information from another object, with the result being that object execution is not stopped to get the results of another object. The flow chart visual programming aid represents flow charts in three dimensions, in one embodiment, with the third dimension permitting showing spinning another thread at a flow juncture. Each object block is provided in one embodiment with a snap shot tab used to call up information about the object in video, audio, pictorial or text form to provide the domain expert with the ability to further understand the object and provide input. An algorithm is presented for flow chart execution which uses the flow chart block numbers and is the same for all flow charts.

2 Claims, 11 Drawing Sheets

FLOW CHART DECISION CLASS/OBJECT

MACRO VIEW

FLOW CHART-BASED PROGRAMMING METHOD AND SYSTEM FOR OBJECT-ORIENTED LANGUAGES

CROSS REFERENCE TO RELATED APPLICATIONS

Not applicable.

FIELD OF INVENTION

This invention relates to programming methods and procedures and more particularly to a system which aids in the creation or writing of an object-oriented program.

BACKGROUND OF THE INVENTION

As is common practice, software engineers utilize one of two approaches for developing computer software. The first approach is called a functional decomposition approach, sometimes called a procedural approach, and an object-oriented approach. The end result of the use of either of these two approaches is the same in that a piece of hardware or software is created to solve a particular problem, usually referred to as a domain problem.

The functional decomposition or procedural approach first breaks down the domain problem into functions. These functions are further decomposed in search of common software routines so that the solution may be efficiently implemented in software. The first functional approach to programming was invented by John Von Neumann in 1947 when flow charts were used to describe computer programming algorithms. Later in the 1950s and 1960s, flow charts were used to specify and describe complete computer programs. As higher level languages, like BASIC, COBOL and C were developed and as applications became more complex, such flow charts fell from favor. New software generating techniques called structured programming were developed and formalized in the 1970s. Structured programming allowed for more modular programs. In the early 1980s a procedural language based on flow charts and multitasking was developed by Ron Lavallee and Tom Peacock and is described in U.S. Pat. No 4,852,047, issued Jul. 25, 1989. In this patent, industrial processes are controlled by characterizing the industrial process with a flow chart and then executing directly from the flow chart, thereby eliminating the necessity for ladder diagram programming tools which were cumbersome at best.

By the mid-1980s, due to the ever increasing complexity of software and never ending changes, object-oriented software emerged. Languages such as Small Talk, C++ and ADA were developed.

By the early 1990s, a simplified object-oriented language called Java was added to the list of object-oriented languages. Due to the advent of the internet and Java, future software development is now tending towards the object-oriented approach. This is because object-oriented software is easier to maintain and promotes software reuse. Software is developed around real world entities and, hence, when a change to how an entity behaves is made, the program is only changed in one place. With a functional decomposition programmed system, a change to behavior usually requires changing the programming in many places.

Importantly, however, in object-oriented programming, the objects making up the program exist in no apparent order and are described by literal statements, making the programming difficult to visualize. Thus when objects are displayed, they are displayed on screen with no visual linkages as to the order of their execution. There is therefore a need for a programming aid which permits both programmers and those charged with solving a domain problem to be able to quickly visualize an object-oriented program from a macroscopic level so that direction can be given and changes can be made to the program.

By way of further background, the characteristics of object-oriented programs are as follows. Presently, object-oriented software programs represent objects and class entities with literal statements. Syntax-based languages such as Java and C++ represent an object such as Jim=new person as a literal statement. Here Jim is an object of the class person. Using the approach provided in the Universal Modeling Language or UML representation, an object would be represented as Jim: person where Jim again is an object of the class person. By definition in all object-oriented languages, objects have attributes, information used by an object and methods or behaviors carried out by an object. Further, all object-oriented systems have a means to describe relationships between objects such as creation or instantiation, messaging, association, dependency and more.

Graphical systems sometimes used to show relationships for clarity, are not needed by the literal systems. Most graphical systems are used for analysis for the particular problem, called the problem domain, and are thereafter converted via generating a program into a literal language such as object-oriented language, such as Java, C++, Small Talk and Effel for execution by a computer.

In the past, graphical systems have primarily used two types of diagrams to describe the domain problem. The two types of diagrams are interaction diagrams and state charts. Interaction diagrams show objects and the messaging between the objects, whereas state charts are used to show object behavior or methods and object life cycle state changes. However, none of these graphical systems constitute the program, which must be generated separately in literal terms.

For instance, as far as interaction diagrams are concerned, these diagrams can take the form of a collaboration type diagram in which individual blocks indicating objects have lines between them and arrows indicating messaging between the blocks. In terms of a sequence for interaction diagrams, a ladder diagram type arrangement is sometimes used in which timing of a sequence runs down the chart, with horizontal arrows indicating messages between the objects.

As to state charts, these charts indicate object behavior. For instance, if an object in the form of a human being is to jump, the state indicates a jump sequence in which an object is to extend the legs, fly the body and land.

The above charting techniques describe some attributes of objects, but not the underlying object-oriented program. These charting techniques can therefore hinder the programmer in explaining the program to the expert who has hired him/her, or even to collect the programmer's thoughts in a manner which will enable quick object-oriented programming.

Thus, in the end object-oriented programming has been performed by making a literal, written statement as to what the object and class is and what the object is supposed to do. Lists of statements are exceedingly hard to interpret to those who are not object-oriented programmers and especially hard for those who are requesting a problem to be solved to understand.

As to Domain Experts, it will be appreciated that object-oriented systems and structured systems focus on how the software is to be constructed, an important point. Thus, the person most able to assist at this point is the domain expert. With software playing an ever increasing role, software engineers must interface with domain experts more and more. Domain experts are, for instance, a banker specifying a banking system, a process engineer defining a manufacturing function or a mechanical designer designing an active suspension for a car.

It will be noted that the software engineer's first task is to capture the domain expert's knowledge. The only way that this is possible is through communication. Text based communication can be ambiguous and often makes it difficult to see what the system is actually doing.

Moreover, the application which the software is to run is typically broken down into use cases. A use case shows the interaction between the user and the system objects that perform a particular function. This is presented to the user in the form of text and ancillary interaction diagrams. However, this is not a natural or intuitive way for the domain expert to visualize the application or the object-oriented programming. The above-mentioned state charts are sometimes used to further define a use case object method, but again, the domain expert must be familiar with state charts to fully understand what knowledge the software engineer thinks he/she is capturing.

Another problem with the current object-oriented program techniques is that they do not readily show exceptions. Exceptions occur when the program or an object does not perform its expected function. It is imperative that exceptions be handled and the domain expert is the one typically required to decide what to do when an exception is encountered.

Moreover, most object-oriented programming requires an iterative approach. The reason that all object-oriented systems encourage an iterative approach to software development is in fact so that the exceptions can be discovered. However, these exceptions can not clearly be seen during the analysis phase of a project because heretofore a system for object-oriented programming has not presented the domain expert or the software developer with a simple way of capturing or visualizing the program to be solved by the domain expert or how the software engineer is intending to solve the problem.

In addition, object-oriented programs are hard to follow. There is thus a necessity for a better methodology to show how a data flows through an object-oriented program. Since object-oriented technology is complex, the promise of increased software productivity has not been realized through object-oriented programming. As a result, object-oriented programming must be made simpler so more programmers can use it effectively.

SUMMARY OF THE INVENTION

Rather than utilizing interaction diagrams or state charts to assist in understanding the program being written, in the subject invention a flow chart is utilized to characterize the object-oriented program itself by providing a visual representation of the software objects such as graphical shapes, icons, pictures, video or audio and also the execution rules for the objects at the same time. The subject system represents object-oriented programming objects such as instantiation, methods, components and messages of software objects. As an important part of the subject programming aid, Decision Objects set the flow, with each object executing independently of the other. In one embodiment an object can be one of two types, Action and Decision. The object type is determined by Object Characterization.

'Object Characterization' is the process of Type Casting an object's function at the point of use on a flowchart. This characterization can either be in the form of an Action (rectangle) or Decision (diamond) three-dimensional element. Objects can be characterized as either or both Types simultaneously.

During an Objects life it may perform a task where it will simply "do" something or perform a task where it will provide an answer to a question asked of it. For example, an automobile control object would perform one task when commanded to "lock all doors and start the engine", and a different task if commanded "are all operating parameters within prescribed limits?" Characterization allows easier understanding of an object's methods. Characterization allows an object to be used with the proper context on a flowchart thereby controlling the direction of flow on the flowchart.

The concurrent execution implied in object-oriented programming permits a simplified representation of the totality of the object-oriented program. Note, it is not the shape of the flow chart element which is important, but rather what the element represents, namely an object, along with the execution rules.

The subject flow charting process has a number of flow charting elements to completely specify the object-oriented program. In one embodiment, the flow charting elements describe flow chart instantiation criteria, a flow chart class or object, a flow chart decision object and object stereotypes or snap shots. Flow chart object representations indicate three-dimensional flow chart flow to be able to capture concurrent operations and threads. The flow charting system also specifies dynamic execution rules, with a flow chart block indicating mixing procedural and object entities. Finally, the flow chart representation aids in the compiling of the object-oriented flow charts, with the same execution algorithm being applied across the flow chart or multiple flowcharts.

By so doing, it is possible to have one only mildly knowledgeable in object-oriented programming, such as a domain expert, to visually inspect the work of an object-oriented programmer, see pit falls of the programming without having a detailed knowledge of how the program was constructed and to provide constructive suggestions, such that the program will run properly without many iterations of the programming effort. Moreover, by representing the object-oriented program in terms of flow charts, the whole entire solution to the domain problem can be at the programmer's fingertips in a visually presented way, such that the programmer can use his or her creativity to visualize the problem, visualize problem areas, and provide creative solutions for what has been presented to the programmer. Also, the flowchart provides a convenient way for the programmer and Domain Expert to navigate through methods and components that are encapsulated in objects.

What is therefore provided is a system utilizing visual representation of flow chart objects and execution rules that permits simplified object-oriented programming. In one embodiment, the executions can either be in an order down the flow chart diagram or across, with object execution being into the page to provide for threads. Thus, one can see at an instant the object involved in the program and how they interrelate. All flow chart objects are executed simultaneously or in parallel and are synchronized when a decision, noted by a Decision Block, is necessary to obtain information from another object.

The flow chart programming aid also permits a Domain Expert to identify exceptions when a program or object does not perform its expected function, permitting the domain expert to decide what to do when an exception is encountered, thereby limiting the number of iterations necessary in perfecting an object-oriented program. In one embodiment, the flow chart representations of an object have a 3D look and feel. Moreover, all objects consist of flow chart methods executing the same rule.

In summary, a visual programming aid for object-oriented programming provides high level visualization for domain experts of the entire object-oriented program to permit understanding of the program on a macro level and to permit the domain expert to participate in the programming. In one embodiment, this is accomplished by visually arranging objects in flow chart blocks, each having a block number. The entire flow chart system represents the flow of events, not the flow of time. This permits concurrent execution of objects if the events permit. The objects are characterized as either action blocks or decision blocks, or both. In one embodiment action blocks are denoted as rectangles, and decision blocks as diamonds. Whether an object is an action or decision type is determined by object characterization which is the process of type casting the function of an object at its point of use on the flow chart. Note that decision objects are used to define the flow of groups of objects which do not have flow by themselves. In one embodiment, all objects execute independent of one another until such time as a decision object requires information from another object, with the result being that object execution is not stopped to get the results of another object. The flow chart visual programming aid represents flow charts in three dimensions, in one embodiment, with the third dimension permitting showing spinning another thread at a flow juncture. Each object block is provided in one embodiment with a snap shot tab used to call up information about the object in video, audio, pictorial or text form to provide the domain expert with the ability to further understand the object and provide input. An algorithm is presented for flow chart execution which uses the flow chart block numbers and is the same for all flow charts.

BRIEF DESCRIPTION OF THE DRAWINGS

These and other features of the Subject Invention will be understood taken in connection with the Detailed Description in conjunction with the Drawings in which.

DETAILED DESCRIPTION

Figure 1A:
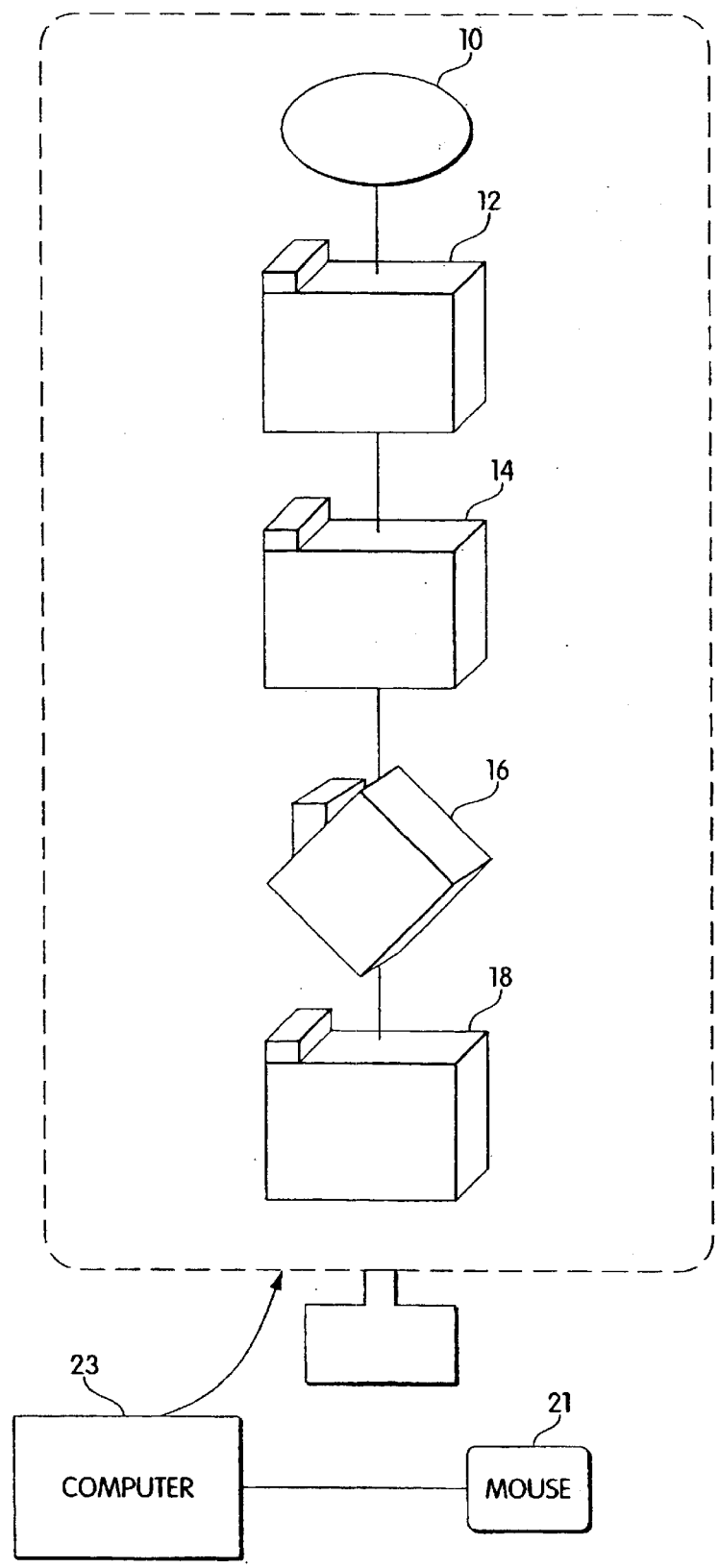
FIG. 1A is a diagrammatic representation of the subject flow charting system showing instantiation criteria for a given object as an ellipse at the top of a flow chart, such that within the ellipse is a description of the condition or an object's instantiation or an object's method that will begin creating of the objects and/or processes located underneath it.

Referring now to FIG. 1A a flow chart is illustrated in which instantiation criteria 10 is utilized by downstream flowchart boxes 12, 14, 16 and 18, each specifying an object in the object-oriented programming. With each of the subject flow charts, instantiation criteria is shown as an ellipse at the top of the flow chart. Within the ellipse is a description of the condition or an object's instantiation or an object's methods that will begin the creation of the objects and/or processes located underneath it. For instance, the instantiation ellipse located at the top of the flow chart could be a condition, such as, for instance, "deposit check". The ellipse could indicate object instantiation such as Jim: person. Finally, the instantiation criteria could indicate the object method such as Jim: person$_{sleep}$( ).

Figure 1B:
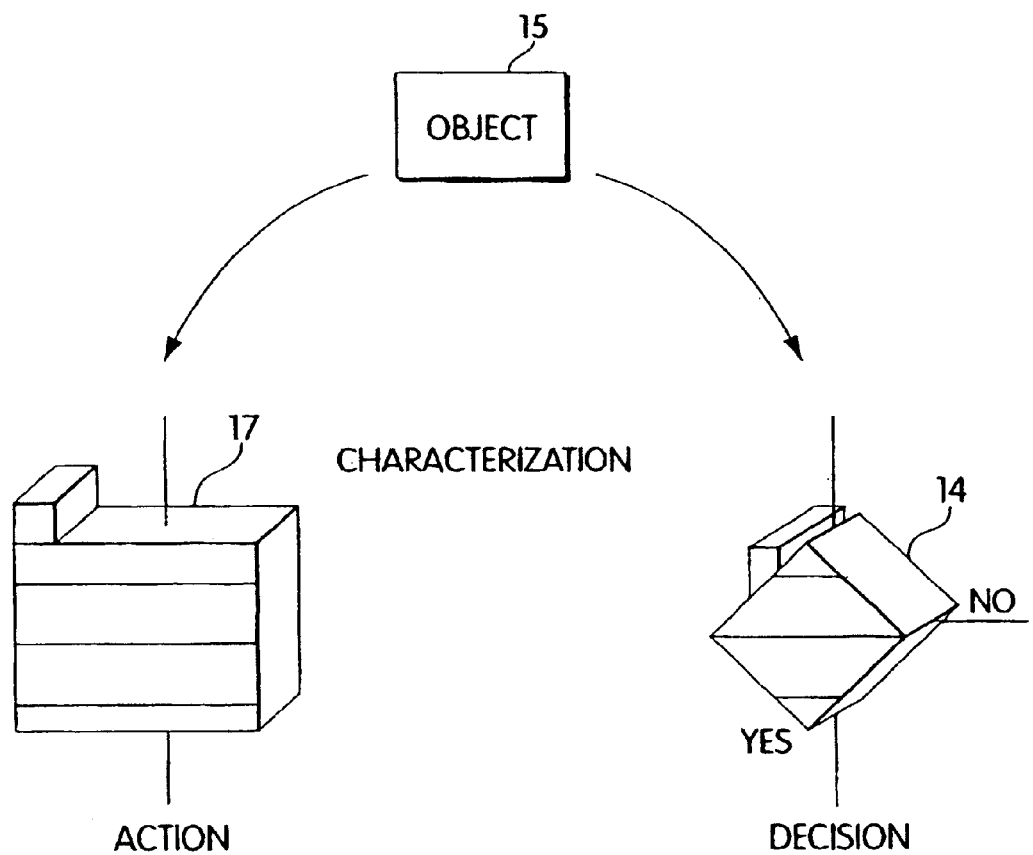
FIG. 1B is a diagrammatic illustration of characterizing an object as an Action Block or Decision Block.

It will be noted in FIG. 1B that as described above each object can be characterized as a three dimensional Action Block or Decision Block, sometimes called a Test Block. Here an object 15 is shown characterizeable as an Action Block 17 which is rectangular or as Decision Block 19 which is diamond shaped.

Figure 2:
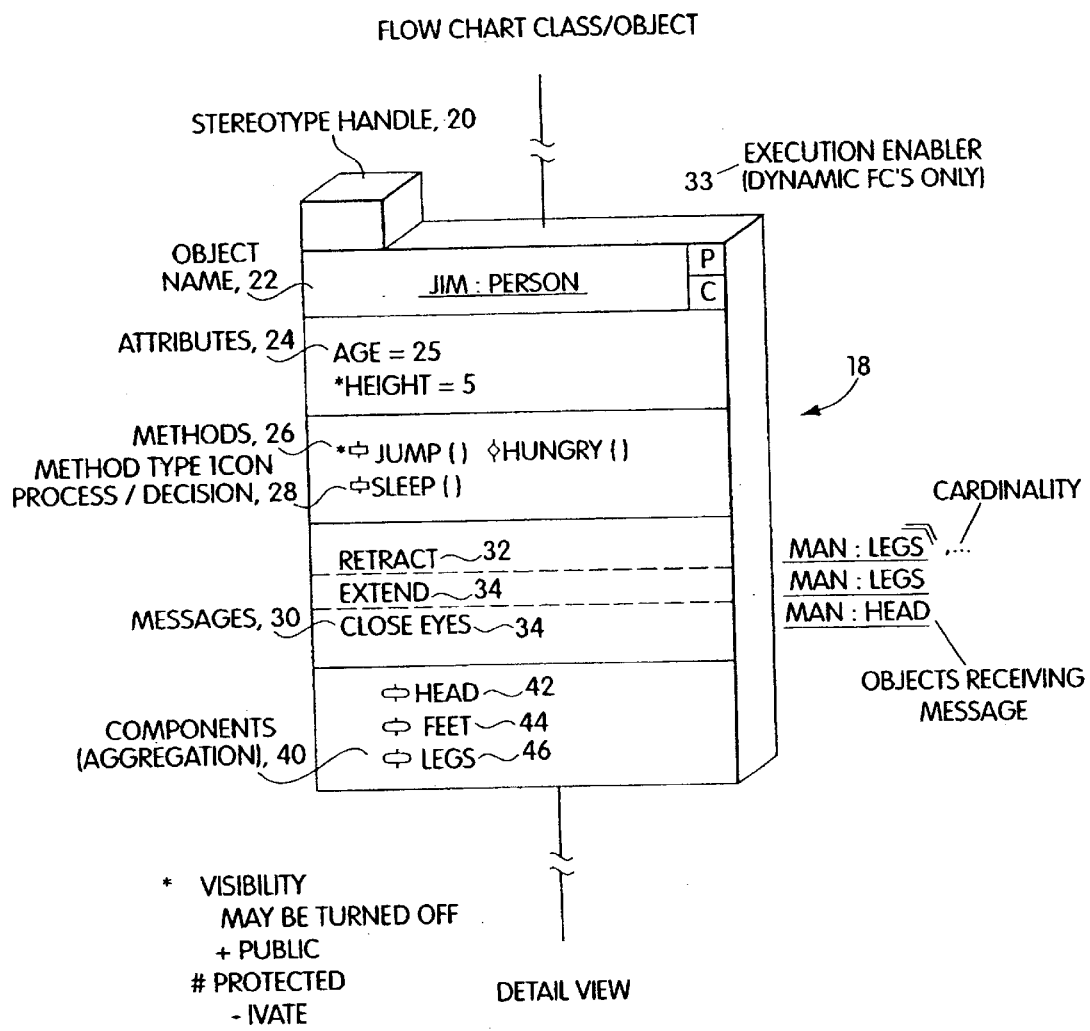
FIG. 2 is a diagrammatic representation of a flow chart class/object Action element indicating in detail a flow chart element having a stereotype handle or snap shot tab, object name, attributes, methods, messages and components, all of which are utilized to together to form the object and to specify what is to be done with it.
Figure 3:
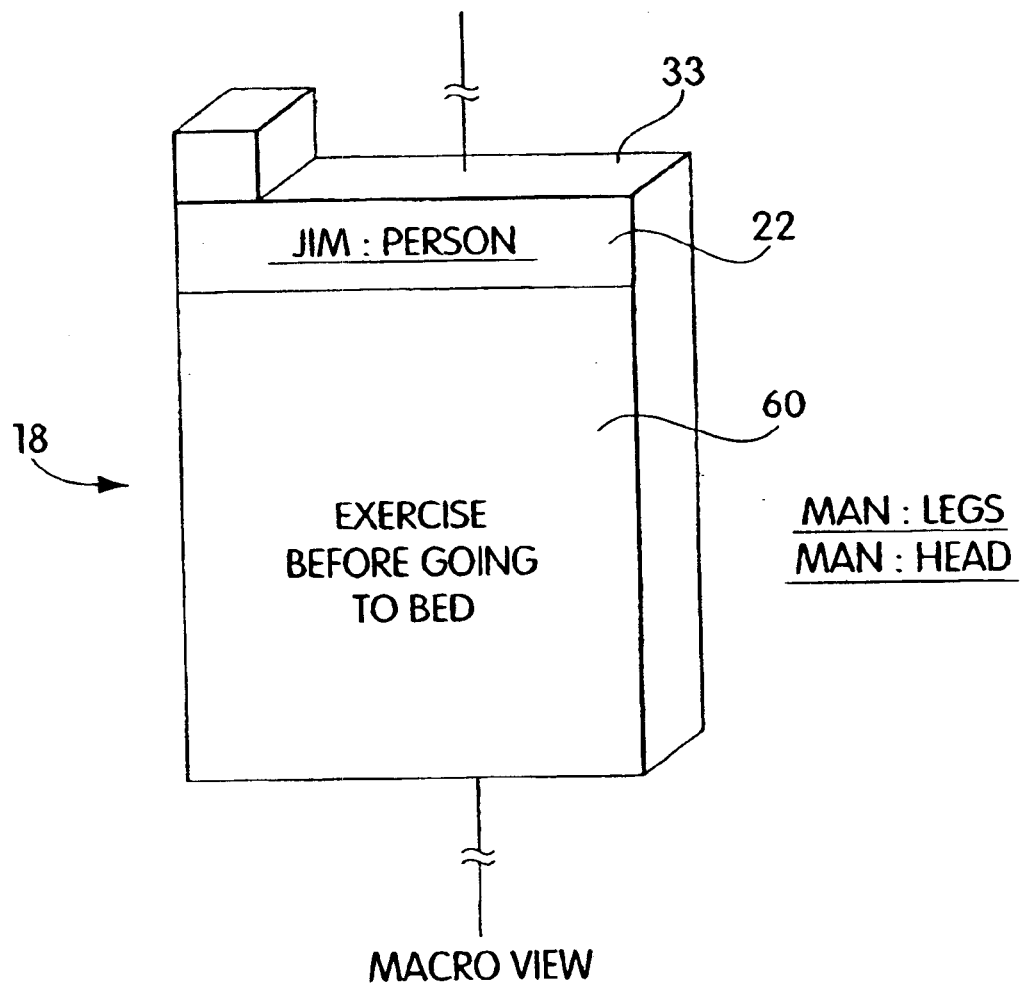
FIG. 3 is a macro view of the flow chart class/object of FIG. 2 in which the object specified and what the object is to do is also specified.

After instantiation and referring now to FIGS. 2 and 3, flow chart action elements describing classes/objects are illustrated. In terms of a detailed view of a flow chart element describing a class/object, as can be seen, a stereotype handle or snap shot 20 is located at the top of the flow chart element which is used to give a snapshot of what is going on in the corresponding object block. Here, the object name is shown at 22, whereas the attributes of the object are shown at 24. Methods, such as what the object is to do or describe, is illustrated at 26 in which method type icons 28 may be utilized to illustrate such things as jump, sleep or hungry in terms of the object, in this case, a person and more particularly, a person named Jim. Process/decision considerations are carried in this method's block.

Messages, here illustrated at 30, may include such commands as retracting one's legs as illustrated at 32, extending one's legs as illustrated at 34, closing one's eyes as illustrated at 36. Messages, which are initiated from methods, are shown to allow navigation to objects performing methods that are not part of this object. Components here illustrated at 40 may be such things as head 42, feet 44 and legs 46. Visibility of certain attributes may be turned off or protected or made public as illustrated at 48, whereas a number is typically given to the block 50 for an execution order.

As illustrated in FIG. 3, the entire flow chart element 18 can be deployed as a macro view and can be used to merely identify the object as illustrated at 22. This provides another indication of the entire process such as illustrated at 60. In this case as is in the case with FIG. 2, the entire flow chart element is used to specify a person named Jim and the exercise he is going to do before going to bed. This type of flow chart element which illustrates the macro view of the object is useful in having a domain expert be able to ascertain what is going on in the object-oriented program and in particular the object.

Figure 4:
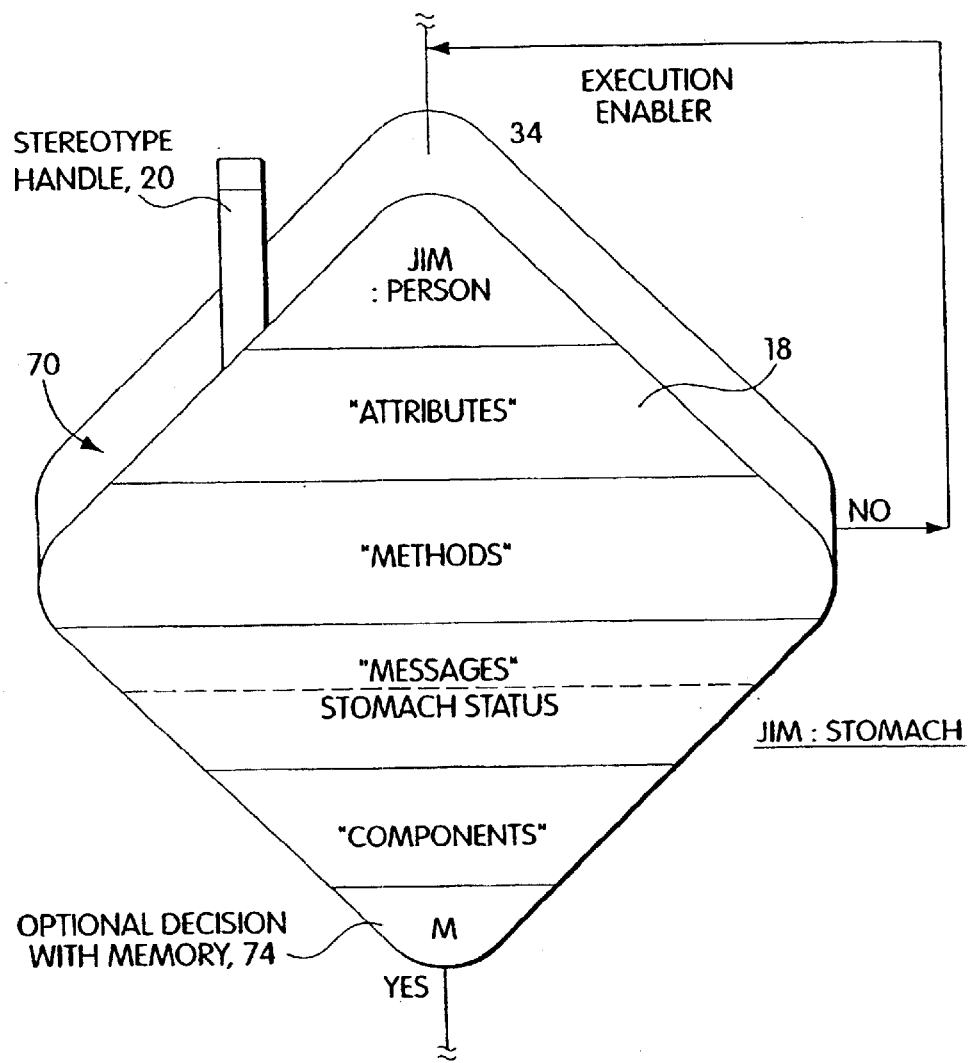
FIG. 4 is a detailed view of the flow chart class/object Decision element which in essence specifies a decision that is to be made with respect to the particular object and its methods and/or messages and/or components as well as its attributes.

Referring now to FIG. 4, what is represented are flow chart elements depicting Decision Blocks which correspond to decision classes/objects. In FIG. 4, a decision object is illustrated at 70 which is in the pictorial form of a 3D diamond. Decision objects have all the same qualities as action objects except they cause the flow of the flow chart to take one of two paths in response to a question. In this case the "No" path can connect to any other block on the flowchart and not necessarily itself.

Figure 5:
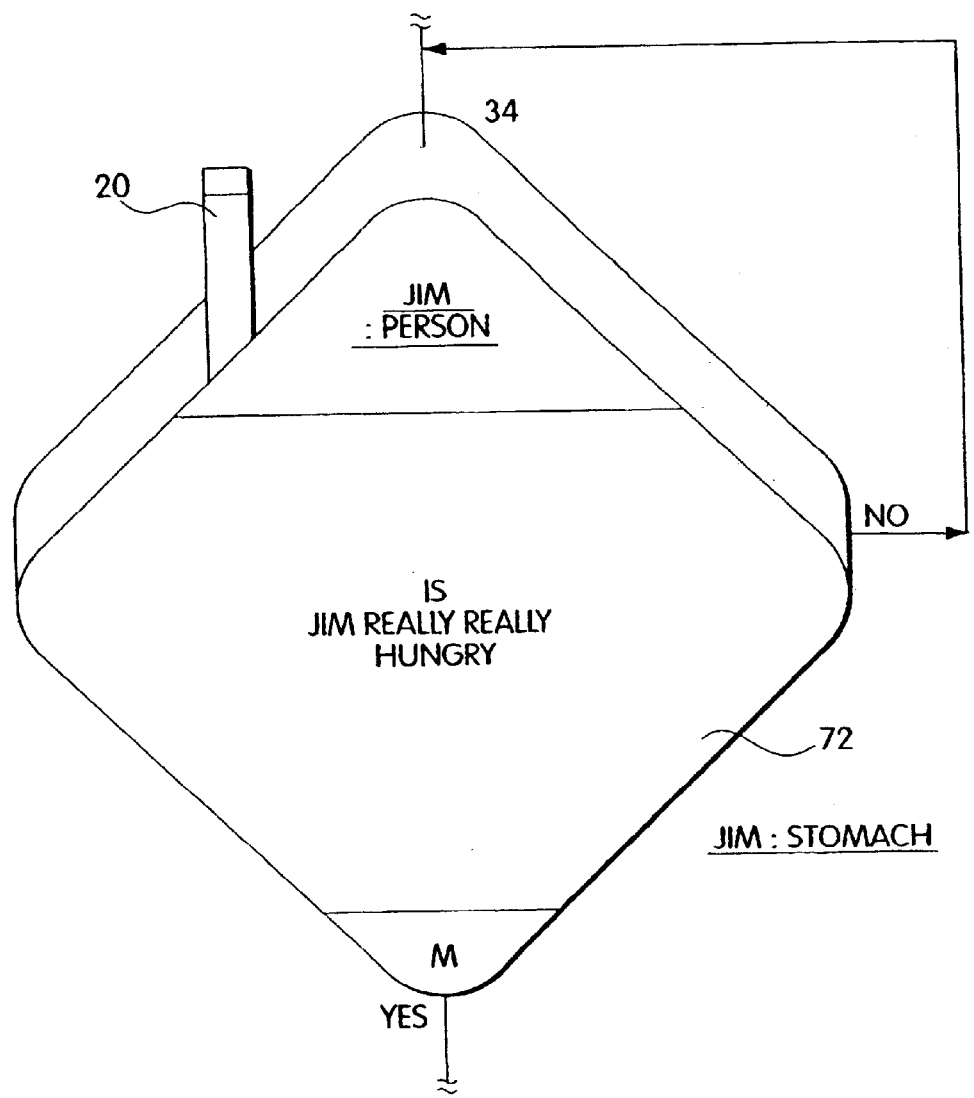
FIG. 5 is a macro view of the flow chart class/object of FIG. 4 illustrating the identity of the object and what is to be done with respect to the object.

Here, object 70 of FIG. 4 is embedded in the diamond. The decision element either specifies that the flow of the program continues as indicated by YES, or not continue as indicated by NO. Clicking on the decision object of FIG. 4 results in the macro view of FIG. 5 in which the decision object specifies the identity of the object and the decision to be made, namely, in this case, "is Jim really, really hungry". As before, clicking the decision object can be made to alternate between macro and detail views. Note, in the detail view of FIG. 4, editing, prioritizing and monitoring acts are described within the appropriate action objects.

One difference between the two object types is the memory or the M feature added to the decision element, namely, the optional decision with memory features, here illustrated at 74. As dynamic flow charts, FC, having block numbers do not represent time and as flow charts and objects are executing in parallel or concurrently, an optional memory feature may be needed to accommodate decision objects, needed so that decision objects may hold the results of the test until control flow reaches that object. In one embodiment, the memory is cleared after the decision is made.

More particularly, an object is pictured as a three-dimensional action or decision entity or one of its stereotypes. These entities can represent a class or an object. Each entity is provided with a name and may have attributes, methods, messages and components.

Note, in the subject invention there are two types of flow charts as opposed to flow chart blocks. One is a static flow chart and the other is a dynamic flow chart. Static flow charts are not running and do not execute. Therefore they represent static qualities of an object, i.e., everything about an object. This permits a programmer to look at an object and select what he wants to use. Thus static quantities include all of the attributes of the object and the visibility, public, private, protected nature of each attribute. Thus a programmer can review an object and select only those parts of the object useful to him. For instance, he may select a method or procedure that the object does. He can also select a snap shot.

All of the methods available are shown in the object along with the visibility. Means including a computer mouse 21 connected to computer 23 as shown in FIG. 1 are provided to edit any of the object fields and is accomplished, in one embodiment, by clicking on the corresponding field.

Each object has a three-dimensional quality to its representation which signifies orthogonal operation of the object. By orthogonal is meant spinning another thread and by three-dimensional is meant a 3-D geometric graphic shape.

In the case of dynamic flow charts, while in prior programming systems the data flow starts and stops at each flow chart block such that the program proceeds serially, in the subject system dynamic flowcharts are executed in a dynamic continuous fashion not having to wait for a preceding block to finish. The dynamic execution is explained hereinafter in terms of dynamic execution rules.

In terms of setting up an Action or Decision object Block, first one names the object. This can be done in UML notation. For instance, the object name is the instance name followed by a colon followed by a class name. An underline is used to signify that this is an instance of a class. On a static flow chart, the instance view can be left blank as illustrated by; person. The underline may be omitted signifying that this is a class.

Next one specifies how the object is derived. Referring to FIG. 2, it will be noted that the "P" and the "C" in the object name field allows the programmer to find out how the object was derived. This is done through navigation to parents or children by clicking on whether or not a parent is inherited or a child is derived. Note that multiple inheritances are allowed.

Also note that by clicking on the object name the macro view of the object, as illustrated in FIG. 3, will be presented. This allows for further abstraction of the object entities and therefore a more understandable flow chart. Clicking on the object name in one embodiment, alternates between the detailed view and the macro view of the object, function at that point on the flowchart.

The next step is to specify the attributes of an object. Note that the attribute field, namely attribute 24, allows editing variable name, type, visibility and visibility in the case of static flow charts and monitoring variables in realtime on dynamic flow charts.

The next step is to specify the method for the object. Clicking the method field allows editing and navigating of the methods.

It is important to note that methods are also flow charts. Method icons help the user to visualize the method characterization, an action or decision. Clicking on the message field allows modifying message names inside the object and message destination, object names outside the object. A cardinality value, e.g. how many messages, may be shown as illustrated at 53 when the object interacts with more than one copy of the receiving object. The UML notation is used for cardinality value. The user has the option of prioritizing the view of methods and messages which can enhance the readability of the flow chart at any point because in many cases objects are used more than once, and characterize as actions or decisions.

As an additional feature of the subject invention at run time various methods and messages that are active can be highlighted. Also, when an object is made up of other objects, double-clicking on the component field allows for navigation to and through other objects that make-up this object.

A key feature of object-oriented technology is abstraction. An object may represent a collection of many objects all operating in parallel. Clicking on the stereotype handle, in this case, handle 20, will evoke the stereotype of the object. That stereotype may be an icon, picture, video clip, audio clip or even a help file. Complete flow charts may be built and executed with stereotypes only. The execution enabler, i.e. block number can be any sequential mechanism consisting of numbers or letters. This mechanism determines the order of objects and allows concurrent orthogonal execution as will the described. Objects with an execution enabler are dynamic and objects without an enabler are static in one embodiment. Block numbers are used for execution rules only and have nothing to do with the static qualities of an object.

Figure 6:
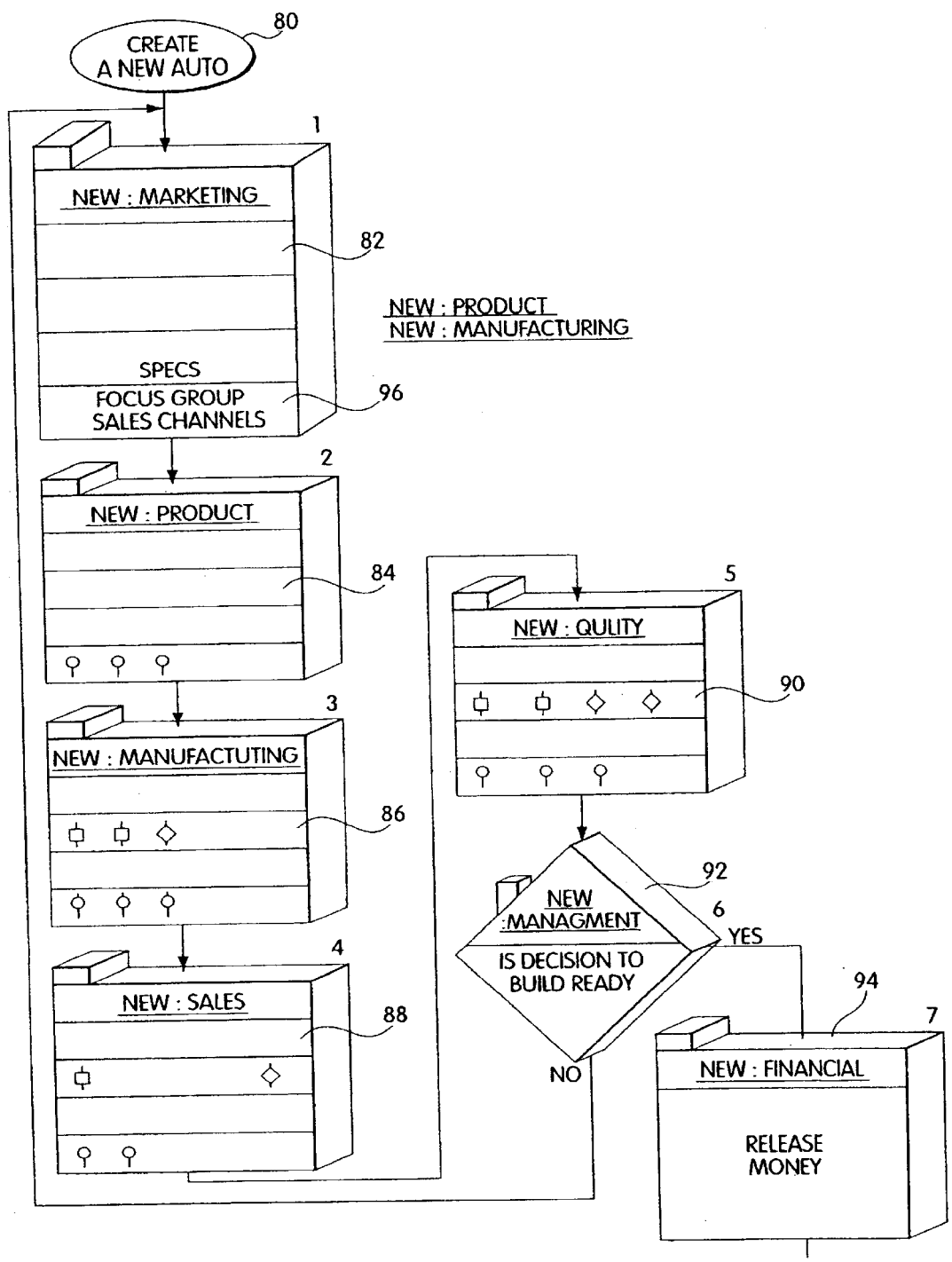
FIG. 6 is a completed flow chart representation of an object-oriented programming task for the creation of a new automobile indicating the providing of market analysis, product analysis, manufacturing analysis, sales analysis and quality analysis followed by a decision element as to whether the newly created automobile is viable, followed by a financial analysis as to whether or not to release money for the development of the automobile.

Referring now to the object stereotypes mentioned hereinabove, the utilization of object stereotypes is one of the most powerful means in which different domain experts can be participate in the creation of software. If each expert can view the system from their point of view, chances are, they will be able to contribute more effectively. The stereotype handle 20 provides a means to evoke various stereotypes. How this may be utilized is shown in FIG. 6, in which the creation of a new automobile is shown. Here, during instantiation as illustrated at 80, the object is to create a new automobile. What is therefore necessary is to find out the need for such an automobile as illustrated at 82 in the flow chart element identified as marketing.

Thereafter as illustrated by element 84, the product required is conceptualized, whereas as illustrated in element 86, the manufacturing for the specified object is delineated. As illustrated in 88, the sales for such an object are developed and as illustrated at 90, the quality of such a new automobile is ascertained. Thereafter, as illustrated at 92 a management decision is made as to whether to go forward or not. If the answer is YES, then as illustrated at 94, release of the money under a certain criteria is determined.

Thus, for instance, if a product development specialist wishes to give input, he/she may wish to highlight the focus group block, here illustrated at 96. By so doing, the specialist would be navigated to the focus group object and its stereotype would be shown. The stereotype, for instance, could be a video clip of the focus group being asked question and the individual could gage enthusiasm for the various product features. The product specialist could then feedback changes required into a new focus group object and to a new product design object. The point with the use of object stereotypes is that views of an object may be customized through the utilization of the stereotyping function.

It will be further noted that in the subject invention, three-dimensional flow charts and dynamic execution rules are utilized as described later. In the case of FIG. 6, objects 82, 84, 86, 88, 90 and 92 are executed concurrently, with each having its own thread running.

It will be appreciated that it is essential that objects have a three-dimensional look and feel to them. This is especially true when objects are an aggregation of a large number of objects all communicating. The problem is further complicated when objects are spread over a network. For this reason, time is not represented by the structure of the flow charts in three dimensions. Rather events are represented. Flow does not stop when a three-dimensional block is reached. Rather the flow continues with all processes executing including the process or thread at the new block. Note, that the processes associated with a block starts when entering the block from a previous event or block.

Figure 7:
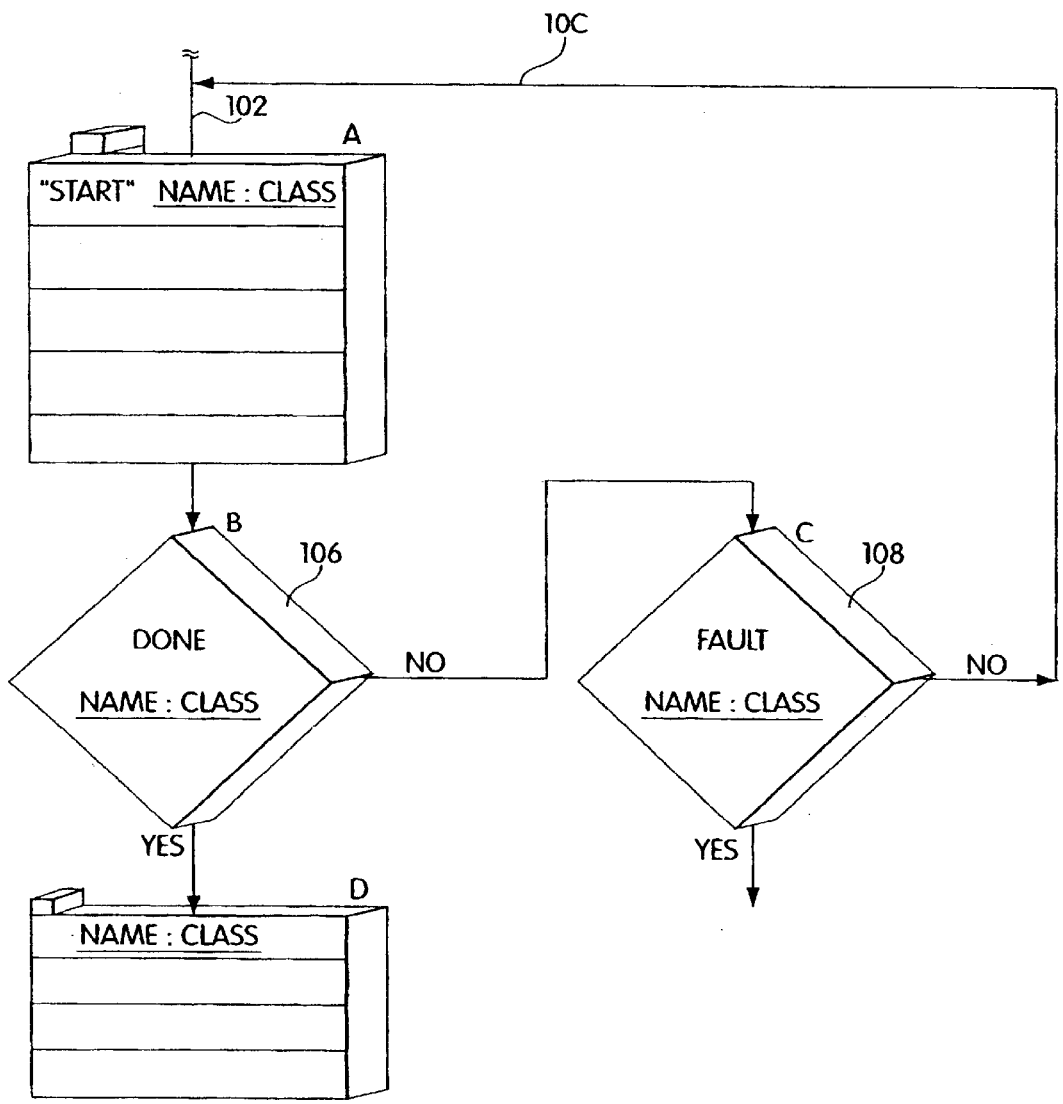
FIG. 7 is a flow chart illustrating the control over an object or procedure and how it is accomplished through the utilization of start events and test events at a Decision block to determine if an object is still processing or has a fault.

Referring now to FIG. 7, the control over any object or procedure on a flow chart is accomplished very simply. An object is perceived as being started as illustrated at 100 when flow enters the object as illustrated at 102. Note, the start is an "event" requiring zero time. If an object is already started when flow returns to that object, as illustrated at 104, the start will have no effect since the event is already processing.

It, therefore, becomes a simple matter to add a test to determine if the object is still processing or has a fault. This is denoted by a Decision Block. Thus, a decision block 106 determines whether or not an object is finished or if not, whether there is a fault, as illustrated at 108. This is event synchronization as opposed to time synchronization.

Figure 8:
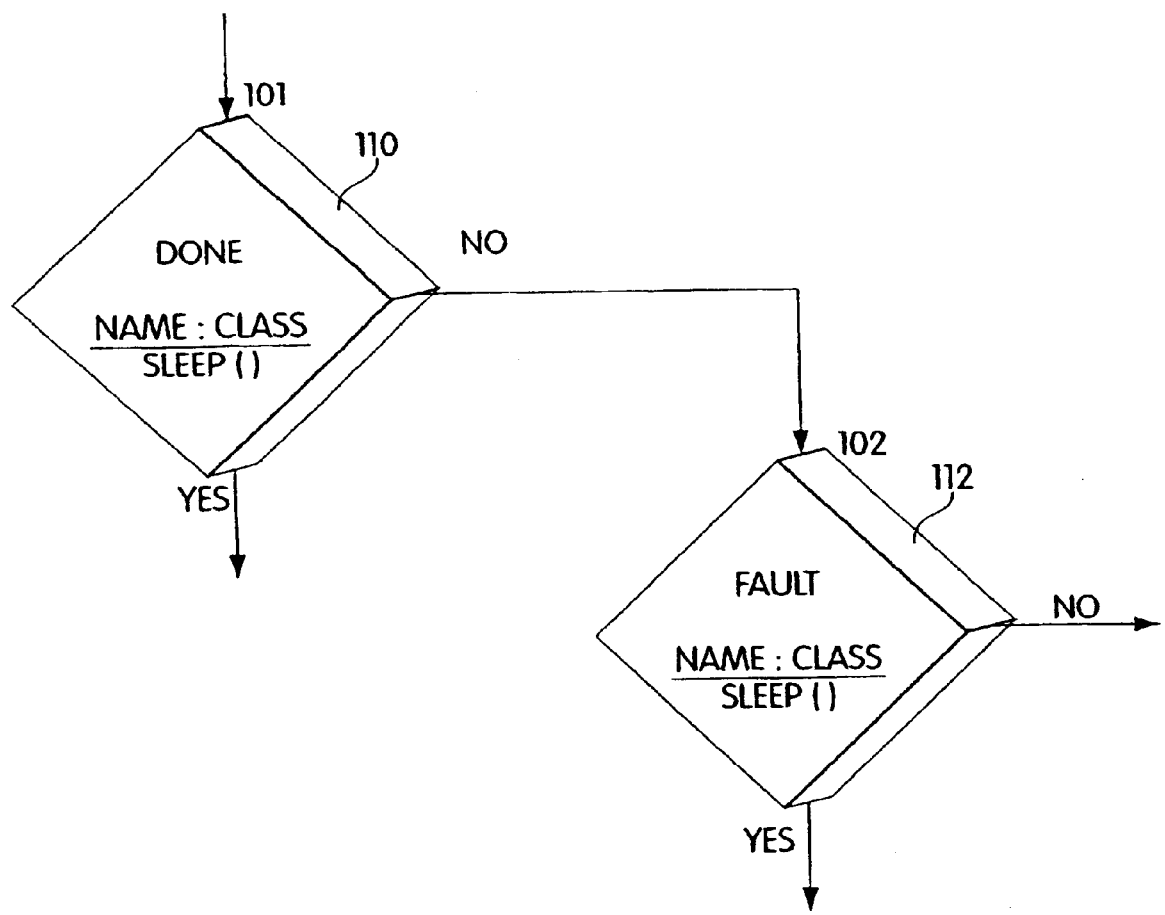
FIG. 8 is a flow chart illustrating how the results of the flow chart of FIG. 7 can be tied to object methods such that objects can be synchronized.

As illustrated in FIG. 8, for instance, if a "sleep" routine is being executed by virtue of an object as illustrated at 110, then the "sleep" routine either has been executed or a fault has occurred as illustrated at 112.

These "done" or "fault" tests can be tied to object methods. Generation of the object "done" and "fault" is accomplished by the flow chart system and may or may not be used. The Decision Block thus provides an elegant way in which objects can be synchronized. In the case of FIG. 7 block (object) "D" will not be executed until object (block) "A" is finished performing it's function.

Figure 9:
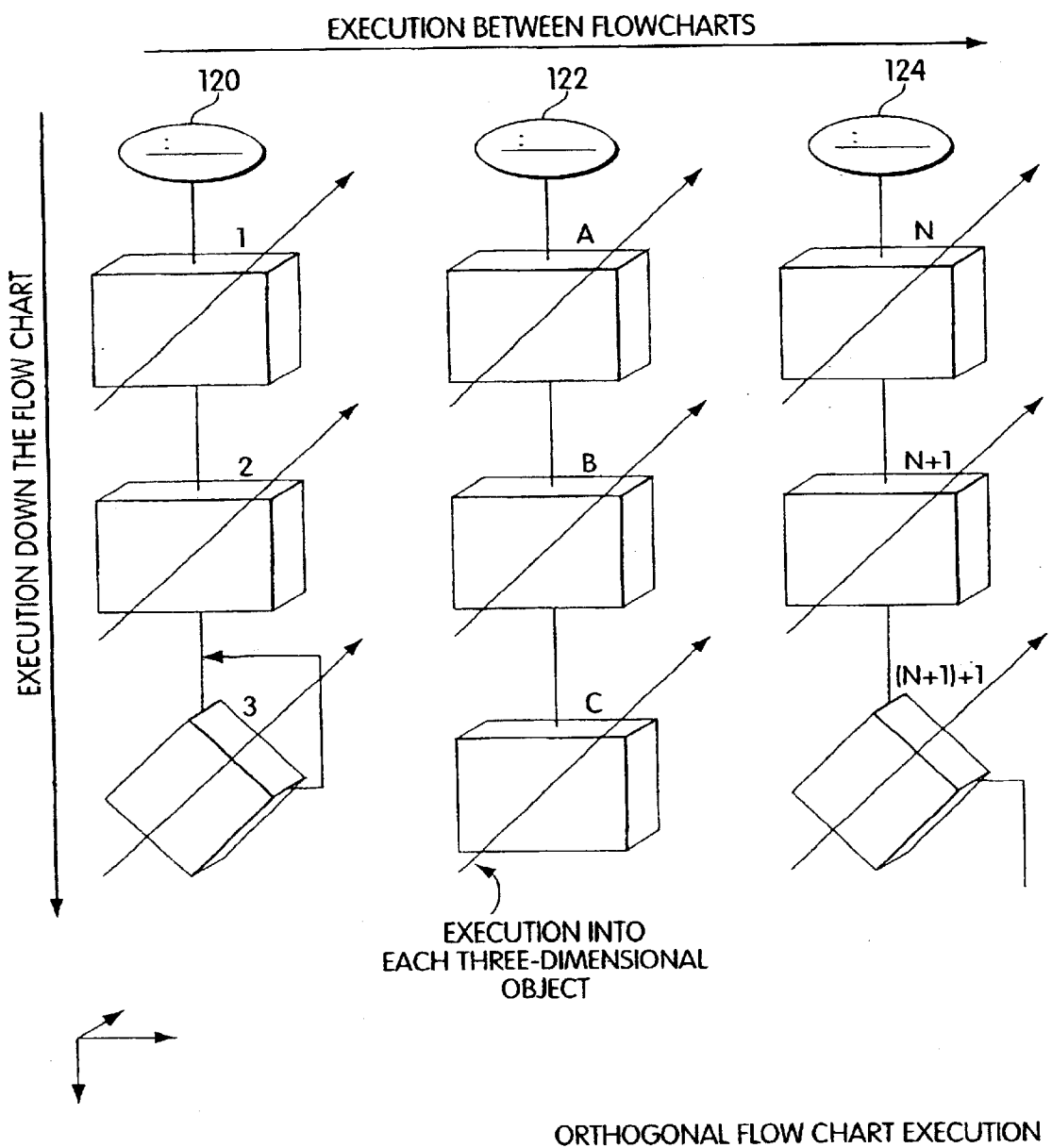
FIG. 9 is a flow chart arrangement indicating orthogonal flow chart execution in which there is both execution between flow charts and execution down the flow charts, also indicating execution into each three-dimensional object; and, FIG. 10 is a flow chart indicating the mixing of two-dimensional entities with three-dimensional entities in which the execution rules still apply.

Referring now to orthogonal flow chart execution in FIG. 9, as will be seen with zero time in mind, the dynamic execution rules become quite simple. All that is needed is a mathematical verifiable sequence. In any multi-tasking computer system some means must be used to allocate processor resources to each object. Most "time slice" systems simply allocate a prescribed amount of time to each object. i.e. 1 millisecond, to execute each task and then repeat the process. In the present invention each flowchart is composed of one or more objects and each object may have multiple tasks, because each method is a task. Therefore, there is significant potential that the processor will need to execute thousands of tasks concurrently causing the system to react very slowly. Another problem with the "time slice" algorithm is that it is hard to predict the point at which one task will end and the next task will begin. A task may be interrupted before it has completed a critical event or it may waste time not performing any useful function.

The subject flowcharts have the inherent advantage in that they are event driven. It is therefore possible to develop task switching algorithms based on events and not a fixed amount of time. This has been done in two dimensions in the FloPro system, but not for objects. Rather the flow charting system was used for simple procedures. One such algorithm is the so called "bread crumb" approach algorithm uses the technique of executing flowchart events (blocks) until the same event is executed again in which one keeps track of the blocks which have been executed, and if the flow comes back to execute one of these again, one stops executing that task and starts another one. This has the disadvantage of slower execution, because a table must be built and each event compared to that table. It can have unpredictable results depending on the paths taken by the flowchart.

A "sequence" algorithm has the advantage of speed and more importantly, predictability. Here, each event (block) is given a sequence identifier, number or letter. Each task (flowchart) is then executed until the event (block) sequence identifier is equal to or less than the present block sequence identifier. This algorithm is predictable and independent of paths taken by the flowchart.

When applied in three dimensions, the subject system has, therefore, 100% verifiable parallel execution as illustrated in FIG. 9. Here, individual flow charts 120, 122 and 124 are simultaneously executing. Note that the algorithm for execution in any dimension is executed as long as there is an increasing series, otherwise it will stop and pick up the next cycle.

A mathematical formula describing the operation of the orthogonal flow chart execution follows:

$$T_{(X,Y,Z)} = (B \geq N)$$

Where: T=the task switch in the X, Y or Z dimensions; B=the currently executing block number; and N=the next block to execute.

It will be appreciated that all objects consist of flow chart methods executing to the same rule. The above algorithm has the advantage that it works for a single processor or multiple processors. As more and more processors are applied, i.e. a processor for each flow chart, for each object and each method of an object, the algorithm does not change because there is no dependency on time, only events, each processor can operate independently at it's own speed.

Figure 10:
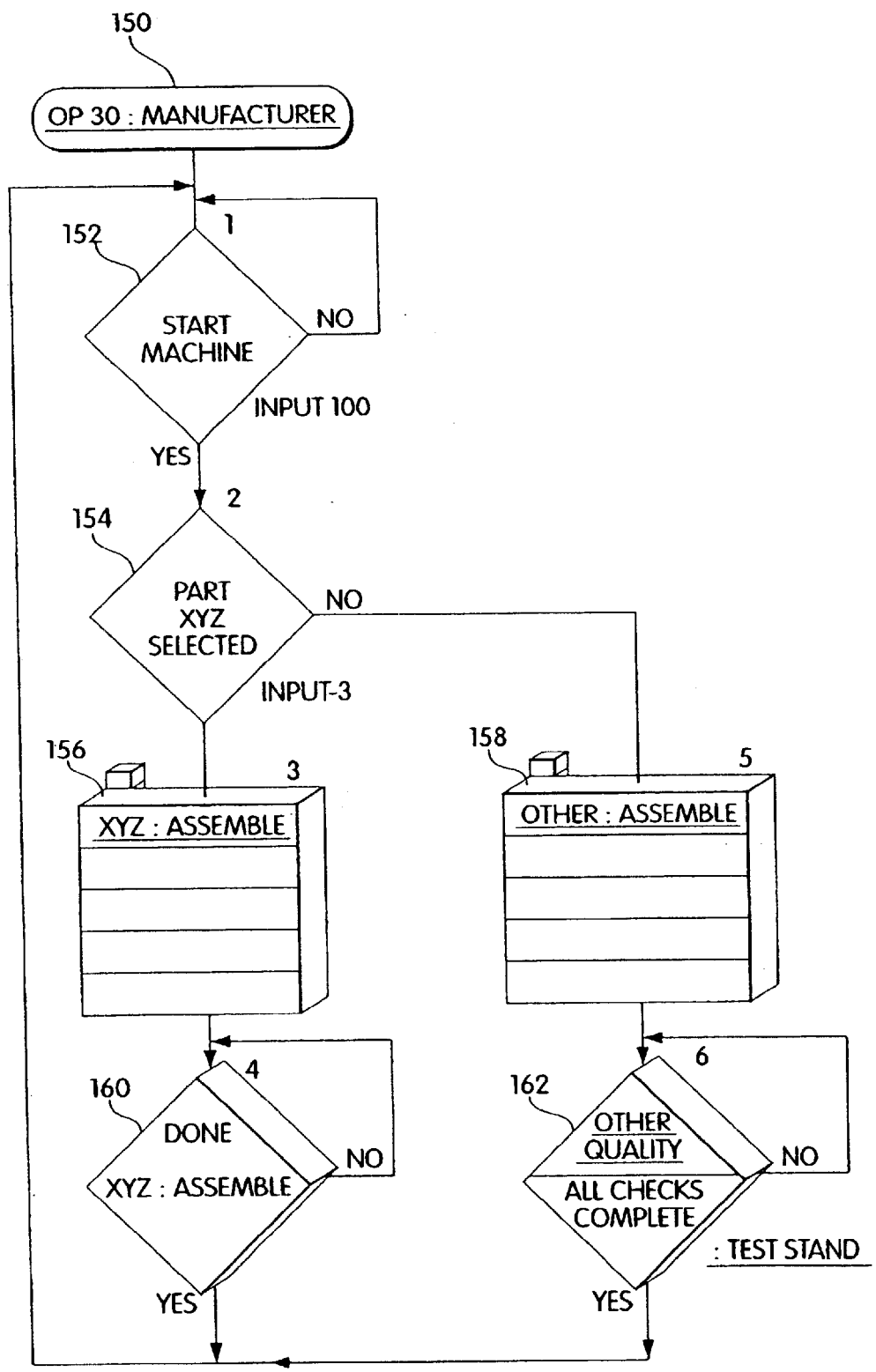

Referring now to FIG. 10, it will be seen that there can be a mixing of procedural and object entries within the flow chart and therefore within the program. As illustrated, the instantiation at 150 may be to provide for operation of an assembly machine, for instance. Here, a procedural block 152 includes starting the machine and a procedural block 154 indicates selection of a part. Thereafter, an object 156 is called which is the assembly object, to assemble a particular device. Otherwise, the assembly of another device may be selected at 154 such as object 158. Assuming that the assembly has been completed by object 156, a decision block 160 is utilized to decide whether or not the particular device has been assembled. Note, as illustrated at 162 the block may be a decision block where quality or other checks may be provided as object task. What will be seen is that procedural blocks may be combined with objects to provide for the complete specification of the programming.

As to the compiling of the object-oriented flow charts, all object-oriented language must have properties of encapsulation, inheritance and polymorphism. Compiling means taking the flowchart graphical representation and generating Java or C++ code for each flowchart element.

The object-oriented flow chart technology which forms a subject of this invention has these properties incorporated therein. Encapsulation, the hiding of details, by allowing the hiding of flow chart object methods and allowing more than one flow chart object to represent many objects or an entire flow chart or flow charts is encompassed by the subject flow charting system. Inheritance, using other class methods and variables is also part of the development environment. Polymorphism, relates to more than one object responding to the same message. This is accomplished in the subject flow charting system by separating message initiation inside the object from the receiving object outside the object. Replacing the receiving object with another has no effect on the sending object.

For the above reasons, object-oriented flow charts of the subject variety can be compiled to any object-oriented language such as Java and C++. With the addition of a persistent database, compilation directly to machine executable code is achieved. Java and C++ both have mechanisms to create and destroy objects. Assembly language and machine code do not. For Java and C++ a compiler need only generate code that will create an object at run time. In the latter case the object must exist (persistent) before it can be compiled to code that will execute at run time.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A visual programming method for assisting in object oriented programming in which the program consists of a number of objects to give a high level visualization of the program at a macro level, comprising the steps of:

assigning a flow chart block to an object, each block having a different assigned number and describing the function of the corresponding object;

arranging the flow chart block so as to visually represent the flow of events in the program; and, executing the program by block number in accordance with the arrangement of the flow chart blocks, the flow chart blocks being three dimensional to specify actions to be completed during the execution of the corresponding block, whereby the third dimension permits showing spinning another thread at a flow juncture.

2. A visual programming method for assisting in object oriented programming in which the program consists of a number of objects to give a high level visualization of the program at a macro level, comprising the steps of:

assigning a flow chart block to an object, each block having a different assigned number and describing the function of the corresponding object;

arranging the flow chart blocks so as to visually represent the flow of events in the program;

executing the program by block number in accordance with the arrangement of the flow chart blocks; and, selecting flow chart blocks with snapshot tabs selectable to call up the display information about the corresponding object.

* * * * *